United States Patent

Stessen et al.

[11] Patent Number: 5,349,390
[45] Date of Patent: Sep. 20, 1994

[54] PICTURE SIGNAL PROCESSOR FOR PERFORMING BOTH LARGE AREA AND SMALL AREA CONTRAST REDUCTION, AND PICTURE DISPLAY APPARATUS INCORPORATING SUCH A PICTURE SIGNAL PROCESSOR

[75] Inventors: Jeroen H. Stessen; Robert R. Meijler, both of Eindhoven, Netherlands

[73] Assignee: U.S. Philips Corporation, New York, N.Y.

[21] Appl. No.: 109,279

[22] Filed: Aug. 19, 1993

[30] Foreign Application Priority Data

Sep. 22, 1992 [EP] European Pat. Off. ......... 92202901.2

[51] Int. Cl.⁵ ............................................. H04N 5/52
[52] U.S. Cl. .................................... 348/679; 348/678
[58] Field of Search ............... 358/169, 168, 174, 175, 358/27, 28, 37, 166, 162, 160; 348/229, 230, 255, 256, 678, 679, 685; H04N 5/57, 5/59, 5/52,

[56] References Cited

U.S. PATENT DOCUMENTS

| | | | |
|---|---|---|---|
| 4,081,838 | 3/1978 | Wheeler | 358/169 |
| 4,204,229 | 5/1980 | Heuze | 358/169 |
| 4,302,777 | 11/1981 | Kemner et al. | 358/169 X |
| 4,710,815 | 12/1987 | Douglas et al. | 348/678 |
| 4,712,132 | 12/1987 | Soca | 358/37 |
| 4,883,991 | 11/1989 | Kröner et al. | 358/174 X |
| 4,989,074 | 1/1991 | Matsumoto | 348/678 |
| 5,014,130 | 5/1991 | Heister et al. | 358/174 X |
| 5,191,407 | 3/1993 | Kawano et al. | 358/174 X |
| 5,204,748 | 4/1993 | Lagoni | 358/169 |
| 5,245,434 | 9/1993 | Gurley | 358/169 |

FOREIGN PATENT DOCUMENTS

| | | | |
|---|---|---|---|
| 3618873 | 12/1987 | Fed. Rep. of Germany | H04N 5/52 |
| 0097479 | 5/1987 | Japan | H04N 5/57 |
| 0264383 | 10/1989 | Japan | H04N 5/57 |

OTHER PUBLICATIONS

TDA 4680, "Die Video-Prozessor-Schaltung TDA 4680, Technische Information 900503".

Primary Examiner—Mark R. Powell
Assistant Examiner—John W. Miller
Attorney, Agent, or Firm—Edward W. Goodman

[57] ABSTRACT

A picture signal processor providing a contrast reduced picture signal, which includes a first contrast reduction device (MUL-R1, D5, CA1) receiving a picture signal (R-in) for providing a first contrast reduced picture signal (R), the first contrast reduction device only reduces the contrast of the picture signal (R-in) when the picture signal (R-in) exceeds a given first threshold (95%) for relatively large areas, while the picture signal processor further includes a second contrast reduction device (MUL-R2, D8, CA2), which is coupled to the first contrast reduction device (MUL-R1, D5, CA1) and which provides the contrast reduced picture signal by immediately reducing the contrast of a too bright part of the first contrast reduced picture signal (R) as soon and as long as an instantaneous amplitude of the first contrast-reduced picture signal (R) exceeds a given second threshold (100%).

5 Claims, 2 Drawing Sheets

PICTURE SIGNAL PROCESSOR FOR PERFORMING BOTH LARGE AREA AND SMALL AREA CONTRAST REDUCTION, AND PICTURE DISPLAY APPARATUS INCORPORATING SUCH A PICTURE SIGNAL PROCESSOR

BACKGROUND OF THE INVENTION

1. Field of the Invention

The invention relates to a picture signal processor having a contrast reduction circuit to protect the processing circuits and the picture display tube from overload. The invention further relates to a picture display apparatus comprising the picture signal processor.

2. Description of the Related Art

Current television receivers comprise a variety of beam current limiters to protect the processing circuits and the picture display tube from overload. A long-term average beam current limiter protects against thermal overload so as to provide a longer picture tube life time. A short term average beam current limiter protects the line output transformer against saturation. The expression "long-term average beam current" relates to the maximum average beam current specified by the picture display tube manufacturer for pictures which are stationary for an indefinite period of time such as during the display of test pictures, computer images, teletext data or stationary television scenes lasting longer than 30 seconds. The expression "short-term average beam current" relates to the condition where the contents and intensity of the displayed image vary continuously such as during live television pictures. The circuits and the picture display tube are further protected from overload by a slow peak beam current limiter which protects against local dooming, i.e. heating of a part of the shadow mask tube due to stationary high intensity picture objects. Finally, a fast peak beam current limiter protects against spot blooming and clipping of the video output amplifiers. All these beam current limiters operate through the existing contrast controller, and if this is not sufficient, through the brightness controller.

The integrated circuit TDA 4680, described in the Philips Components pamphlet "Die Video-Prozessor-Schaltung TDA 4680, Technische Informationen 900503", comprises a peak and average beam current limiter, see section 2.5 of the pamphlet. The peak beam current limiter operates as follows. The voltage across a capacitor forms the setting voltage for the peak beam current limiting. This setting voltage is multiplied by a value which represents the contrast desired by the user. When the beam current is within its admissible peak value range, the capacitor is charged up to a charge voltage of about 4 V. When the peak beam current becomes too large, a current source is activated to rapidly discharge the capacitor with a discharge current exceeding 4 mA. A corresponding contrast reduction and, when necessary, brightness reduction is achieved until the peak beam current has returned to within its admissible range. When the signal peak amplitude is reduced, the capacitor is recharged with a charge current of about 1 $\mu$A which is substantially smaller than the above-mentioned discharge current. Consequently, it lasts for several picture periods until the contrast and brightness settings resume the values desired by the user after disappearance of a large peak value in the video input signal. This is deemed to be necessary, because large peak values commonly appear punctually in the displayed picture, so that the obtained contrast and brightness reduction may not have changed substantially when the large peak values reappear in a subsequent field period. The contrast and brightness settings are thus influenced by three entities, viz. the setting asked for by the user, the setting determined by the average beam current limiter, and the setting determined by the peak beam current limiter. The smaller of the settings determined by the average and peak beam current limiters is multiplied by the setting asked for by the user to obtain the final contrast setting.

The following problems are observed in such prior art television receivers. 1) Since the overall picture contrast is reduced, the whole picture becomes soft, possibly due to only a single peak excursion in the entire picture. 2) Due to changing signal contents, the contrast will exhibit an annoying "pumping", i.e. it is constantly going up and down. Since the contrast regulating range is very large, this is clearly visible. The latter behavior is exaggerated by the habit of factory preprogramming the contrast to a maximum: during prolonged large scenes, the contrast will always move up to its maximum. 3) The contrast control circuitry is responsive to many other signals than the user contrast control signal, and in consequence as long as any limiting operation occurs, the upper range of the contrast control seems to be "dead" in a manner not understood by the user.

U.S. Pat. No. 4,712,132 describes another device for reducing the amplitude range, i.e. the contrast of signals representing an image. The device comprises a circuit for determining at each instant a correction signal whose instantaneous value is a predetermined non-linear function of the present input color signal having the highest value at that instant. For each of the three color signals, the device further comprises a separate multiplier which multiplies the corresponding color signal by the correction signal. The device has the drawback that the non-linear function does not sufficiently ensure that a given maximum admissible amplitude of the color signal is not exceeded.

SUMMARY OF THE INVENTION

It is, inter alia, an object of the invention to provide a picture signal processor which yields a good picture display quality and prevents the given maximum admissible amplitude of the color signal from being exceeded. To this end, a first aspect of the invention provides a picture signal processor for providing a contrast reduced picture signal, comprising first contrast reduction means coupled to receive a picture signal for providing a first contrast reduced picture signal, said first contrast reduction means only reducing the contrast of said picture signal when said picture signal exceeds a given first threshold for relatively large areas; and second contrast reduction means coupled to said first contrast reduction means for providing said contrast reduced picture signal by immediately reducing the contrast of a too bright part of the first contrast reduced picture signal as soon and as long as an instantaneous amplitude of the first contrast reduced picture signal exceeds a given second threshold.

A second aspect of the invention provides a picture display apparatus having a picture signal processor for supplying picture signals to a picture display screen, wherein the picture signal processor includes first contrast reduction means coupled to receive a picture signal for providing a first contrast reduced picture signal, said first contrast reduction means only reducing the contrast of said picture signal when said picture signal exceeds a given first threshold for relatively large areas; and second contrast reduction means coupled to said first contrast reduction means for providing a contrast-reduced picture signal for supply to said picture display screen by immediately reducing the contrast of a too bright part of the first contrast-reduced picture signal as soon and as long as an instantaneous amplitude of the first contrast reduced picture signal exceeds a given second threshold.

Two distinct contrast-reducing functions can be recognized in the picture signal processor of the present invention. The first contrast-reducing function more or less resembles a conventional contrast controller; however, it becomes operative only when the picture signal exceeds a first threshold during larger areas like persons' faces. The second contrast-reducing function is immediately operative when the maximum admissible amplitude of the picture signal is exceeded, while it also immediately ceases to be operative as soon as the picture signal amplitude falls below its admissible maximum. Thus, the second function acts like a clipper which cuts off any excess amplitude of the picture signal. This combined operation of the first and second functions prevents the contrast of the whole picture from being reduced when only a small portion, like a broadcaster's logo or subtitles, exceeds the maximum admissible amplitude of the picture signal. On the other hand, larger areas like human faces keep their details because the overall contrast is reduced by the first contrast reducing function when the picture signal amplitude becomes too large for such picture parts. When the first contrast-reducing function has become operative, the signal applied to the second contrast-reducing function is below its admissible maximum so that the clipper function which might clip all details in, for example, faces, is inoperative.

These and other aspects of the invention will be apparent from and elucidated with reference to the embodiments described hereinafter.

DESCRIPTION OF THE PREFERRED EMBODIMENT

Figure 1:
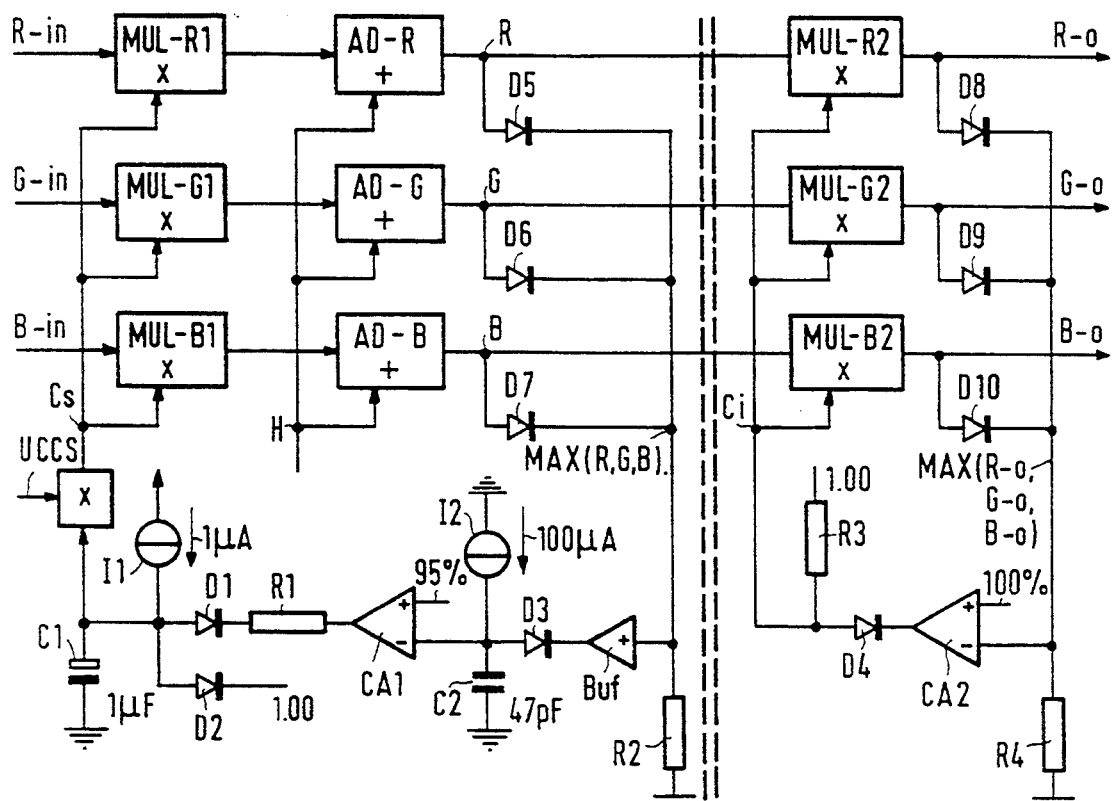
FIG. 1 shows a first embodiment of a picture signal processor in accordance with the present invention.

In the embodiments of the picture signal processor shown in FIG. 1, red, green and blue input signals R-in, G-in and B-in are applied to a first contrast control device comprising three multipliers MUL-R1, MUL-G1 and MUL-B1. The multipliers MUL-R1, MUL-G1 and MUL-B1 multiply the input signals R-in, G-in and B-in by a slow contrast control signal Cs. The output signals of the multipliers MUL-R1, MUL-G1 and MUL-B1 are applied to respective adders AD-R, AD-G and AD-B which add a brightness control signal H to these output signals. Three diodes D5, D6 and D7 determine the maximum MAX(R,G,B) of the output signals R, G and B of the adders AD-R, AD-G and AD-B, respectively. The maximum MAX(R,G,B) is available at a resistor R2 and applied to a cathode of a diode D3 through a buffer amplifier BUF. The anode of the diode D3 receives a supply current I2 of 100 $\mu$A and is connected to ground through a capacitor C2 of 47 pF.

The anode of the diode D3 is further connected to an inverting input of a control amplifier CA1, whose non-inverting input receives, for example, 95% of a maximum admissible output voltage. The output of the control amplifier CA1 is coupled to the cathode of a diode D1 through a resistor R1. The anode of the diode D1 is connected to the anode of a diode D2 whose cathode is coupled to receive a signal corresponding to a multiplier factor 1 so that the contrast control signal at the anode of the diode D1 cannot exceed the value 1. The anode of the diode D1 is further connected to ground through a capacitor C1 of 1 $\mu$F, and receives a supply current I1 of 1 $\mu$A. If the amplifier CA1 has a low output voltage, diode D1 will be conducting so that the voltage across capacitor C1 decreases and the contrast diminishes. The supply current I1 serves to charge the capacitor C1 up to a nominal value of about 4 to 5 V which is determined by the diode D2. The signal at the anode of the diode D1 is multiplied by a user contrast control signal UCCS to form the slow contrast control signal Cs.

When MAX(R,G,B) has a high value (at a bright part of the video signal, such as occurs when a person's face is displayed), the diode D3 does not conduct and the capacitor C2 is charged slowly by the supply current I2. If, due to this slow charging, the voltage across the capacitor C2 has become high, a contrast-limiting operation is initiated by the amplifier CA1 and the diode D1. However, as soon as MAX(R,G,B) has a low value again, the capacitor C2 is immediately discharged through the diode D3, so that it takes a relatively long "bright" period for the capacitor C2 to recharge to a level at which a contrast limiting operation is initiated. This operation of the contrast control device, in which a contrast limitation is only initiated when the period at which a "bright" part of the video signal is displayed exceeds a certain minimum duration, differs completely from the operation of prior art contrast control devices. In such prior art contrast control devices, the direction of conductance of the diode D3 would be inverted and the supply current I2 would be a discharge current rather than a charge current, so that the contrast limitation would immediately be initiated as soon as the video signal becomes too bright, while the contrast limitation would only be terminated if the video signal had been at a lower value for a period exceeding the certain minimum duration. This first control device of the circuit according to the invention thus constitutes a peak beam current limiter for larger areas like faces. It is slow, and influences the whole image for a longer period of time.

The output signals R, G and B of the adders AD-R, AD-G and AD-B, respectively, are applied to a second contrast control device comprising three further multipliers MUL-R2, MUL-G2 and MUL-B2. The multipliers MUL-R2, MUL-G2 and MUL-B2 multiply the signals R, G and B by an immediate contrast control signal Ci. Three diodes D8, D9 and D10 determine the maximum MAX(R-o,G-o,B-o) of the output signals R-o, G-o and B-o of the further multipliers MUL-R2, MUL-G2 and MUL-B2, respectively. The maximum MAX(R-o,G-o,B-o) is available at a resistor R4 and applied to an inverting input of a control amplifier CA2, whose non-inverting input receives, for example, 100% of a maximum admissible output voltage. The output of the control amplifier CA2 is connected to a cathode of a diode D4, whose anode is connected to receive a signal corresponding to a multiplier factor 1 through a resistor R3. The immediate contrast control signal Ci is taken from the junction point of the resistor R3 and the diode D4. If the diode D4 does not conduct, the immediate contrast control signal Ci is 1. The second contrast control device operates in such a way that as soon and as long as the maximum MAX(R-o,Goo,B-o) exceeds the maximum admissible output voltage, the output of the control amplifier CA2 becomes low, so that the diode D4 starts to conduct and the immediate contrast control voltage Ci decreases. If the maximum MAX(R-o,G-o,B-o) is smaller than the maximum admissible output voltage, the output of the control amplifier CA2 becomes high, so that the diode D4 no longer conducts and the immediate contrast control voltage Ci attains its original value 1 again.

This second contrast control device thus constitutes a peak clipper. It is only operative for small areas like subtitles and logos and influences only small details because, when large areas are concerned, the first control device already reduces the voltages R, G and B. It is fast and has no memory. Because of the immediate action of the second contrast control device when a too bright portion of the video signal is present, it was possible to let the first contrast control device only respond to bright parts which exceed a certain minimum duration. On the other hand, if such large bright parts were only corrected by the second contrast control device, faces would be flat and without details. If in response to such faces, the first contrast control device reduces the overall contrast, large bright areas like faces will not lose their details. On the other hand, the overall contrast is not reduced if only small bright portions like broadcaster's logos are present; such small bright portions are adjusted by the locally operative second contrast control device.

It is possible to drastically simplify the second contrast control device by replacing the multipliers MUL-R2, MUL-G2 and MUL-B2 by three resistors, while the interconnected cathodes of the diodes D8, D9 and D10 are connected to a reference voltage source. In this simplified embodiment, the elements R4, CA2, D4 and R3 are dispensed with. This simplified embodiment individually prevents each one of the output signals R-o, G-o or B-o from exceeding the reference voltage of the reference voltage source. While, in principle, color errors may result from such an individual peak beam current limiting operation, not much harm is done, as in practice broadcaster's logos are white anyway; white peak excursions remain white, even after individual peak beam current limitations of the three color signals.

Figure 2:
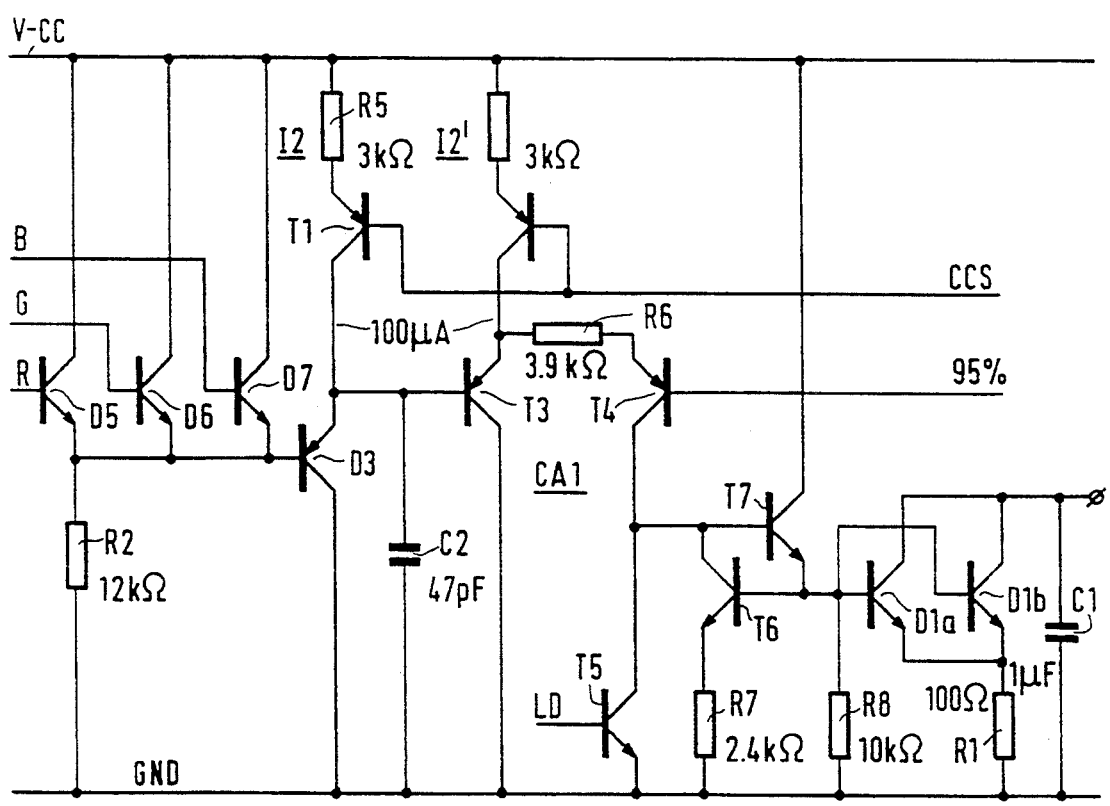
FIG. 2 shows a feedback path of a first contrast control loop of a second embodiment of a picture signal processor in accordance with the present invention.

In the feedback path of the embodiment of the first control device shown in FIG. 2, the signals R, G and B are applied to the bases of three NPN transistors D5, D6 and D7. The collectors of the NPN transistors are connected to the supply voltage V-CC. The three emitters are interconnected and coupled to ground GND through the resistor R2 of 12 kΩ. The three emitters are further connected to the base of a PNP transistor D3, whose collector is connected to ground. The PNP transistor D3 fulfils the function of the buffer amplifier BUF of FIG. 1 as well. The emitter of the PNP transistor D3 is connected to the current source I2 which is constituted by a PNP transistor T1 whose emitter is connected to the supply voltage V-CC through a resistor R5 which is 3 kΩ. The base of the transistor T1 receives a current control signal CCS. The emitter of the PNP transistor D3 is connected to ground through the capacitor C2, and to one input of the control amplifier CA1. The control amplifier CA1 includes two PNP transistors T3, T4, whose emitters are coupled through a resistor R6 of 3.9 kΩ. The base of the PNP transistor T3 is connected to the emitter of the PNP transistor D3. The collector of the PNP transistor T3 is connected to ground. The emitter of the PNP transistor T3 is connected to a current source I2' which is similar to the current source I2. The base of the PNP transistor T4 receives 95% of the maximum admissible output amplitude. The collector of the PNP transistor T4 is connected to ground through an NPN transistor T5, whose base receives a signal LD which provides a one line period delay which is particularly necessary when SECAM signals are processed.

The collectors of the transistors T4 and T5 are further connected to the collector of an input transistor T6 of a current mirror whose parallel circuited output NPN transistors D1a, D1b together correspond to the diode D1 of FIG. 1. The diode D1 is formed by two transistors arranged in parallel to provide an additional amplification; in this way it fulfils part of the task of the amplifier CA1 of FIG. 1. The emitter of transistor T6 is connected to ground through a resistor R7 of 2.4 kΩ. The collector of the transistor T6 is connected to its base through the base-emitter path of an NPN transistor T7 whose collector is connected to the supply voltage line V-CC. The bases of the transistors T6, D1a, D1b are connected to ground through a resistor R8 of 10 kΩ. The emitters of the transistors D1a, D1b are connected to ground through the resistor R1 of 100 Ω. The collectors of the transistors D1a, D1b are connected to ground through the capacitor C1 of 1 μF; the further elements D2, I1 connected to the anode of the diode D1 are not shown in FIG. 2.

Figure 3:
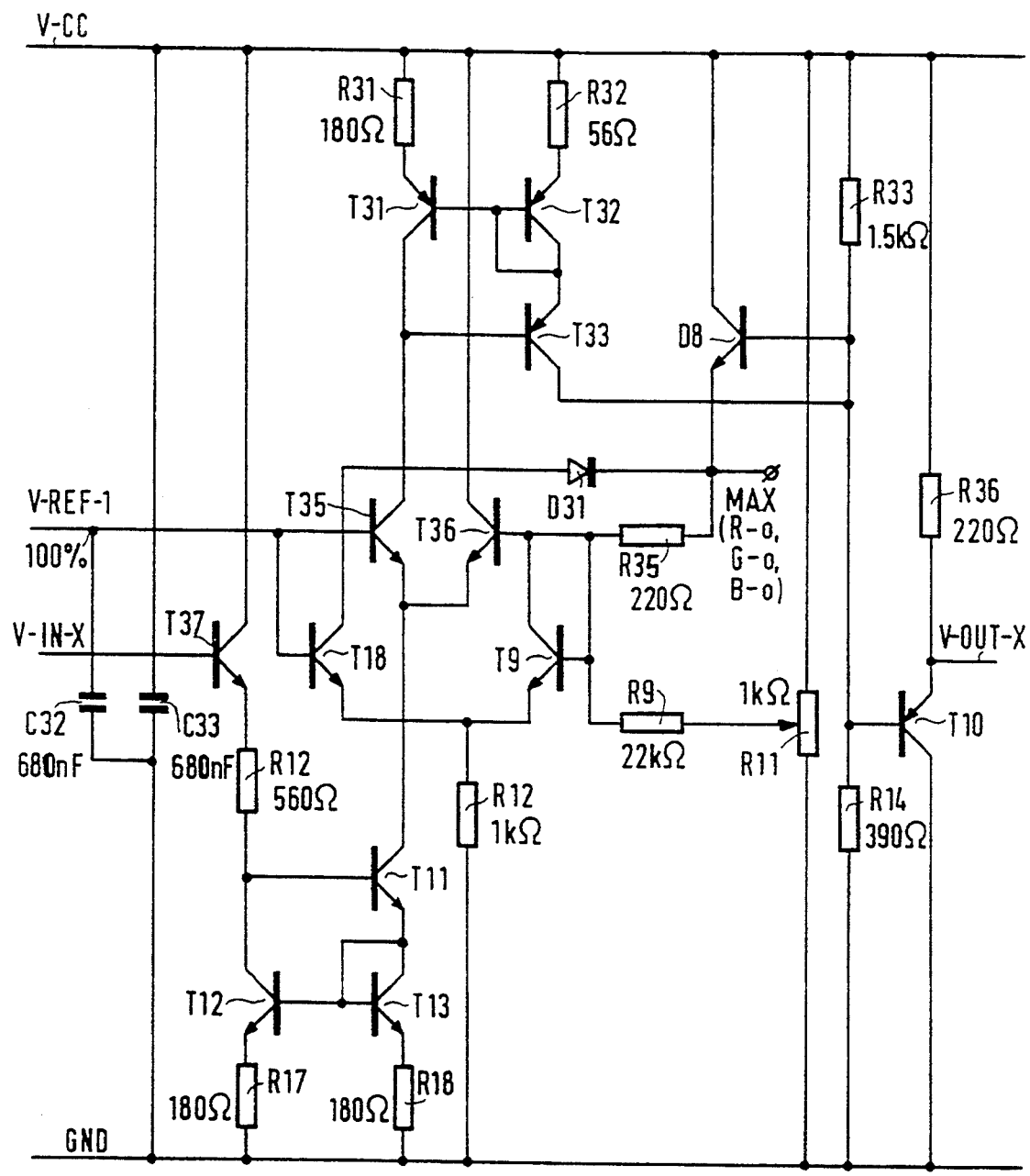
FIG. 3 shows one section of a second contrast control loop of the second embodiment of a picture signal processor in accordance with the present invention.

FIG. 3 shows a preferred embodiment of one section of the second control device of the picture signal processor in accordance with the present invention. An input terminal V-IN-X receives one of the signals R, G or B in FIG. 1. The input terminal V-IN-X is further coupled to a voltage-to-current converter comprising the transistors T37, T11, T12, T13, and the resistors R12, R17, R18. The input terminal V-IN-X is coupled to the base of the NPN transistor T37. The collector of the transistor T37 is connected to the supply line V-CC. The emitter of the transistor T37 is connected to ground through the resistor R12 of 560 Ω, the collector-emitter path of the NPN transistor T12, and the resistor R17 of 180 Ω. The collector of the transistor T12 is connected to the base of the NPN transistor T11, whose emitter is connected to ground through the collector-emitter path of the NPN transistor T13 and the resistor R18 of 180 Ω. The collector of the transistor T13 is connected to its base and to the base of the transistor T12.

The collector of the transistor T11 is connected to a gilbert-cell current multiplier, which fulfils the functions of the elements CA2, D4 and R3 of FIG. 1. The gilbert-cell multiplier comprises the NPN transistors T35, T36, T8 and T9. The collector of the transistor T11 is connected to the emitters of the transistors T35 and T36, whose bases are connected to the bases and to the collectors of the transistors T8 and T9, respectively. The emitters of the transistors T8, T9 are connected to ground through a resistor R13 of 1 kΩ. The bases of the transistors T8 and T35 are connected to a reference voltage terminal V-REF-1 which receives 100% of a maximum admissible output voltage. The bases of the transistors T9 and T36 are connected, through a resistor R9 of 22 kΩ, to a wiper terminal of a trimming resistor R11 of 1 kΩ between the supply line V-CC and ground. The trimming resistor R11 allows trimming for gain tolerances. The base of the transistor T36 constitutes the multiplier input of the gilbert-cell multiplier and is connected to the junction point of the cathodes of the diodes D8, D9, D10 through a small resistor R35 of 220 Ω which provides a voltage-to-current conversion. The junction point of the cathodes is further connected to the cathode of a diode D31 whose anode is connected to the base of the transistor T35. The diode D8 of FIG. 1 is represented by an NPN transistor whose emitter is connected to the junction point of the cathodes and whose collector is connected to the supply line V-CC.

The collector of the transistor T36 is connected to the supply line V-CC. The collector of the transistor T35, which conveys the output current of the gilbert-cell multiplier, is connected to a current-to-voltage converter which comprises PNP transistors T31, T32, T33, and resistors R31, R32, R33, R14. The collector of the transistor T35 is connected to the supply line V-CC through the collector-emitter path of the transistor T31 and the resistor R31. The collector of the transistor T31 is connected to the base of the transistor T33, whose emitter is connected to the supply line V-CC through the collector-emitter path of the transistor T32 and the resistor R32. The bases of the transistors T31, T32 are connected to the collector of the transistor T32. The collector of the transistor T33 is connected to the base of the transistor D8, to the supply line V-CC through the resistor R33 of 1.5 kΩ, to ground through the resistor R14 of 39 Ω, and to the base of an output PNP transistor T10. The collector of the output transistor T10 is connected to ground. The emitter of the output transistor T10 is connected to the supply line V-CC through a resistor R36 of 220 Ω, and to an output terminal V-OUT-X which supplies one of the signals R-o, G-o or B-o in FIG. 1.

It should be noted that the above-mentioned embodiments illustrate rather than limit the invention, and that those skilled in the art will be able to design many alternative embodiments without departing from the scope of the appended claims. Especially the indicated values of the various circuit elements, voltages and currents are merely preferred examples, while there are many alternatives to, for example, the voltage-to-current and reverse converters. It is to be understood that where the claims refer to a picture signal which exceeds a given threshold, these claims not only cover the situation where a large amplitude relates to a bright part of the picture while a small amplitude relates to a dark part, but also the reverse situation where a small amplitude relates to a bright part of the picture while a large amplitude relates to a dark part; in the latter case, the reference to a picture signal which exceeds a given threshold covers the situation where the picture signal falls below the given threshold, and reversely.

We claim:

1. A picture signal processor for providing a contrast reduced picture signal, comprising:

first contrast reduction means coupled to receive a picture signal for providing a first contrast reduced picture signal, said first contrast reduction means only reducing the contrast of said picture signal when said picture signal exceeds a given first threshold for relatively large areas of an image formed by said picture signal when displayed; and second contrast reduction means coupled to said first contrast reduction means for providing said contrast reduced picture signal by immediately reducing the contrast of a too bright part of the first contrast reduced picture signal as soon and as long as an instantaneous amplitude of the first contrast reduced picture signal exceeds a given second threshold.

2. A picture signal processor as claimed in claim 1, wherein said second contrast reduction means constitute a peak-clipper.

3. A picture signal processor as claimed in claim 2, wherein said peak-clipper comprises means for effecting a contrast reduction of all color signals by the same factor.

4. A picture signal processor as claimed in claim 1, wherein said first contrast reduction means comprise a unilaterally conductive element coupled to rapidly discharge a capacitor when said picture signal falls below said given first threshold, said capacitor being slowly charged when said picture signal exceeds said given first threshold, and said first contrast reduction means only reducing the contrast of said picture signal when a charge on said capacitor has reached a certain threshold value.

5. A picture display apparatus comprising a picture signal processor for supplying picture signals to a picture display screen, wherein the picture signal processor includes:

first contrast reduction means coupled to receive a picture signal for providing a first contrast reduced picture signal, said first contrast reduction means only reducing the contrast of said picture signal when said picture signal exceeds a given first threshold for relatively large areas of an image formed by said picture signal when displayed on said picture display screen; and second contrast reduction means coupled to said first contrast reduction means for providing a contrast-reduced picture signal for supply to said picture display screen by immediately reducing the contrast of a too bright part of the first contrast-reduced picture signal as soon and as long as an instantaneous amplitude of the first contrast reduced picture signal exceeds a given second threshold.

* * * * *